United States Patent
Reiche

(10) Patent No.: US 6,246,358 B1
(45) Date of Patent: Jun. 12, 2001

(54) METHOD AND ELECTRONIC CIRCUIT FOR THE PROCESSING OF AN ANALOG SIGNAL

(75) Inventor: Martin Reiche, Konigswinter (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/309,854

(22) Filed: May 11, 1999

(30) Foreign Application Priority Data

May 12, 1998 (DE) .............................................. 198 21 188

(51) Int. Cl.[7] ...................................................... G01S 7/285
(52) U.S. Cl. ............................. 342/118; 342/127; 342/135
(58) Field of Search .............................. 342/118, 85, 127, 342/89, 135, 174

(56) References Cited

U.S. PATENT DOCUMENTS

| | | | |
|---|---|---|---|
| 3,576,565 | * 4/1971 | Schulz | 340/258 X |
| 4,056,971 | * 11/1977 | Van Valkenburg et al. | 73/629 |
| 4,228,688 | * 10/1980 | Sharpe | 73/631 |
| 4,297,701 | * 10/1981 | Henriques | 342/125 |
| 4,453,825 | * 6/1984 | Buck et al. | 356/5 |
| 4,567,484 | * 1/1986 | Schilz et al. | 342/27 |
| 4,699,508 | * 10/1987 | Bölkow et al. | 356/5 |
| 4,994,811 | 2/1991 | Moreira | 342/305 |
| 5,065,105 | * 11/1991 | Bruere et al. | 324/662 |
| 5,221,928 | 6/1993 | Dahl | 342/205 |
| 5,291,031 | * 3/1994 | MacDonald et al. | 250/577 |
| 5,337,055 | 8/1994 | Ghignoni | 342/93 |
| 5,428,439 | * 6/1995 | Parker et al. | 356/5.01 |
| 5,495,252 | * 2/1996 | Adler | 342/127 |
| 5,633,643 | * 5/1997 | Erhage | 342/159 |
| 5,880,821 | * 3/1999 | Dunne | 356/5.05 |
| 6,040,898 | * 3/2000 | Mrosik et al. | 356/5.09 |

FOREIGN PATENT DOCUMENTS

| | | |
|---|---|---|
| 32 37 137 | 10/1982 | (DE) . |
| 3237137 | 9/1983 | (DE) . |
| 0406878 | 1/1991 | (EP) . |
| 0588688 | 6/1994 | (EP) . |

* cited by examiner

*Primary Examiner*—John B. Sotomayor
(74) *Attorney, Agent, or Firm*—J. Gordon Lewis

(57) ABSTRACT

An electronic circuit for the processing of an analog electrical signal is provided with a receiver for receiving the signal reflected by an object. The amplitude of the signal received is a function of the distance of the object from the receiver. A circuit is provided for the adaptation of the signal to a reference signal.

14 Claims, 3 Drawing Sheets

METHOD AND ELECTRONIC CIRCUIT FOR THE PROCESSING OF AN ANALOG SIGNAL

BACKGROUND OF THE INVENTION

The invention relates to a method for the processing of an analog electrical signal which is reflected from an object and received by a receiver where the amplitude of the signal received is a function of the distance of the object from the receiver. The invention also relates to an electronic circuit for the processing of an analog electrical signal with a receiver for the reception of the signal reflected from an object where the amplitude of the signal received is a function of the distance of the object from the receiver.

For example, in the case of distance measurements, the transmitted signal travels from the transmitter to the reflecting object and returns to the receiver. Over this path the signal is damped proportionally to the distance. The amplitude of the signal received is thus a function of the distance between the object and the transmitter or receiver. Also, the signal received is a function of the geometric size and, for example, of the reflectivity of the material of the object. The signal received from a small object with low reflectivity will be more attenuated than a signal from a larger object with high reflectivity.

The received signal must be digitized for further processing. For this purpose it must be converted by an analog/digital converter into a digital signal. For the reasons stated above, because of the possibly very high dynamic range of the amplitude of the received signal, the input range of the analog/digital conversion must be fully exploited so that the analog/digital conversion has low quantization noise in relation to the strength of the signal.

SUMMARY OF THE INVENTION

It is the objective of the invention to provide a method and an electronic circuit for the processing of an analog electrical signal with which an improved utilization of the analog/digital conversion is possible.

This objective is realized according to the invention in a method of the initially mentioned type by adapting the signal to a reference signal. Also, the objective is realized according to the invention in the case of an electronic circuit of the initially mentioned type by providing a means of adapting the signal to a reference signal.

By adapting the signal to a reference signal, the dependence of the signal on the geometric size and the reflectivity of the object as well as on the angle of incidence of the wavefront and the position of the object is compensated for in the antenna characteristics. The signal is adapted to the reference signal independently of these parameters and thus has, after a transient recovery time, a value which can be predetermined. The input range of the analog/digital converter can thus be better exploited so that the signal/noise ratio can be increased in the case of signals that are small in relation to the reference value and the quantization noise can be decreased. In the case of signals that are large in relation to the reference value, overdriving and, thus, a reduction of the signal integrity are avoided.

In the case of an advantageous refinement of the invention, the signal is linked to a function with which the dependence on distance is compensated for. For this purpose, means for linking of the signal to a function are provided with which the dependence on distance can be compensated for.

By compensating for the dependence of the signal on distance, the input range of the analog/digital converter can be better exploited. Thus, the quantization noise in the case of small signals is reduced or the risk of overdriving is reduced.

Further characteristics, possibilities for application, and advantages of the invention follow from the subsequent description of embodiment examples of the invention which are represented in the figures of the drawing. Therein all described or represented characteristics individually or in arbitrary combination form the object of the invention independently of their summary in the claims or as referred to, as well as independently of their formulation or representation in the description or in the drawings.

DESCRIPTION OF THE PREFERRED EMBODIMENTS

Figure 1:
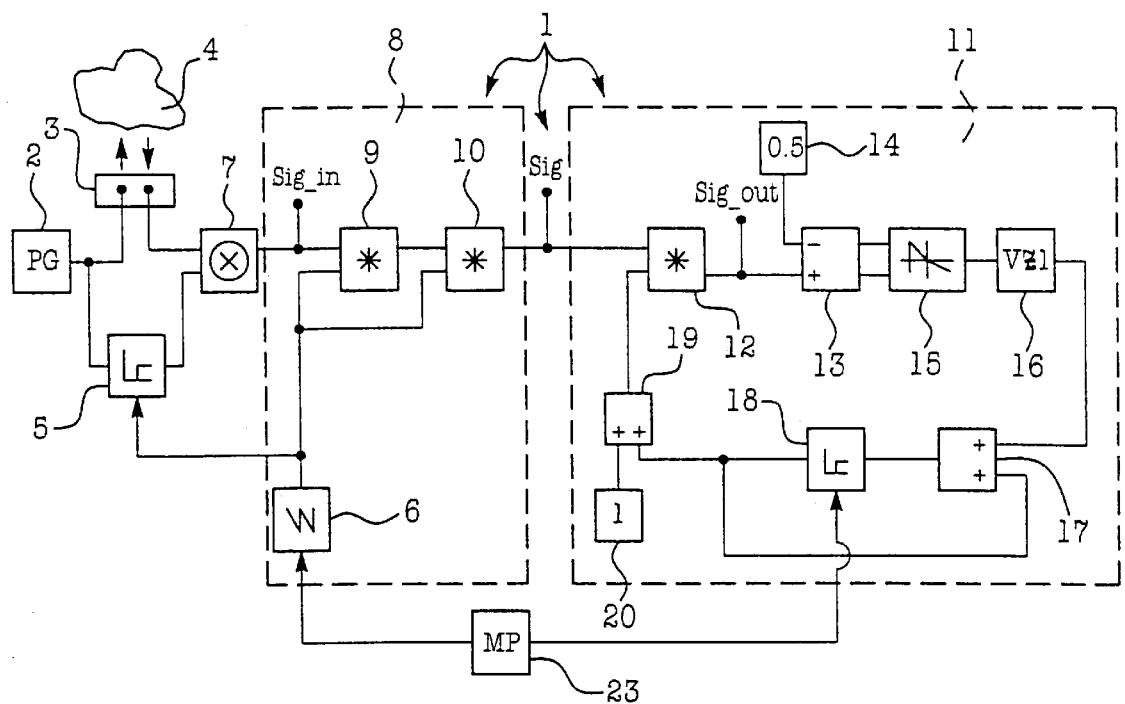
FIG. 1 shows a schematic block diagram of a first embodiment example of a circuit according to the invention for the processing of an analog electrical signal.

In FIG. 1, a circuit 1 is represented which is provided for the generation and subsequent processing of an analog electrical signal. The circuit 1 can, for example, be used for the purpose of determining the distance of a motor vehicle from an object. It is expressly noted that this example does not represent the only possibility for application of the circuit 1.

In the circuit 1, a pulse generator (PG) 2 is provided which generates a pulse signal, in particular, a high-frequency pulse radar signal. Furthermore, a distance sensor 3 is provided which has a transmitter and a receiver, in particular, a transmitting and a receiving aperture, which serves to transmit the pulse signal in free space. The pulse signal is radiated by the transmitter of the distance sensor 3 with predetermined radiation characteristics. The distance sensor 3 can be located, for example, in the front bumper of a motor vehicle so that the signal is radiated, for example, ahead of the motor vehicle.

If an object 4 is located in front of the motor vehicle, then the radiated signal is reflected by the object 4 in the direction back to the distance sensor 3. The reflected signal is received there by the receiver of the distance sensor 3.

As a function of the radial distance at which the object 4 is from the distance sensor 3 and thus, for example, from the motor vehicle, the pulse signal requires an external transit time in order to travel from the transmitter of the distance sensor 3 to the object 4 and back again to the receiver of the distance sensor 3. Due to a spatial attenuation acting on the pulse signal, the amplitude of the pulse signal is damped on its way from the transmitter to the object 4 and back again to the receiver of the distance sensor 3. This damping of the amplitude is done in particular with a pulse radar signal in the ideal case quadratically as a function of the distance of the object 4 from the distance sensor 3. In the case of other pulse signals, however, another damping characteristic can be present.

The pulse signal is also fed to a delay element 5 with which an internal reference delay is simulated. This reference delay is generated variably in such a way that it corresponds to the external transit time which, in turn, corresponds to the current distance of the object 4 from the distance sensor 3. For example, the distance can be between approximately 0.2 m and approximately 5 m if the circuit 1, for example, is provided as a parking aid for a motor vehicle.

The delay of the internal delay element 5 is predetermined by a sweep generator 6, which generates a sweep voltage that repeats after one sweep period and that falls or rises linearly from an initial value to a final value which determines the variable delay of the internal delay element 5. It is insignificant in this case whether the sweep voltage rises and/or falls and/or runs linearly. It is significant that the initial and the final values of the sweep voltage correspond to the minimum and maximum internal delays, respectively, and, thus, to distances of the object 4 from the distance sensor 3 or the corresponding external transit times. Thereby it is achieved that the external transit time of the delay element 5 corresponding to the entire possible range for distance or observation is run through for the purposes of the comparative continuous transit time measurement.

A pass of the sweep voltage from the initial value to the final value or vice versa is designated as one sweep and represents a continuous pass through the entire range for distance or observation. As mentioned above, this sweep is passed through repeatedly so that the pass is also repeated on an ongoing basis. In this way, for example, the approach of the motor vehicle to the object 4 can be recognized by the repeated registration of distance information.

The signal received by the receiver of the distance sensor 3 and the signal output by the delay element 5 are fed to a comparator 7, in particular, a mixer. If the delay of the delay element 5 corresponds to the external transit time of the pulse signal from the transmitter to the object 4 and back again to the receiver of the distance sensor 3, then the comparator 7 generates a signal with maximum amplitude. However, if the delay of the delay element 5 does not correspond to the external transit time of the pulse signal, then the amplitude of the signal generated by the comparator 7 is very small.

Figure 2A:
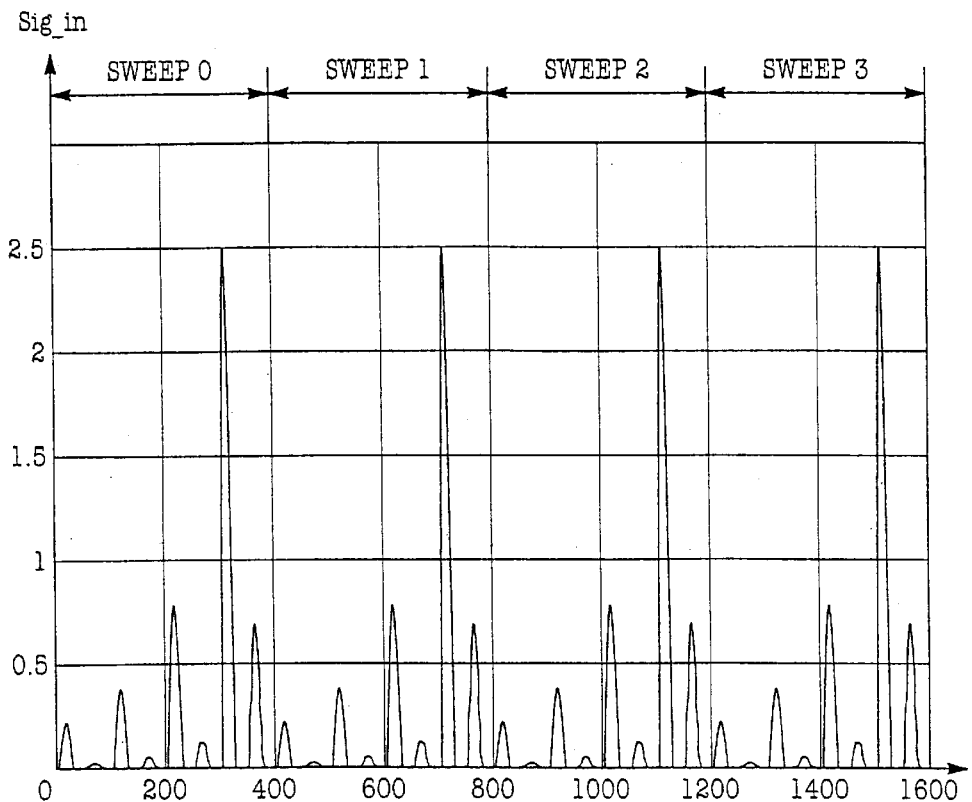
FIG. 2a and 2b show schematic signal waveforms over time of signals of the circuit of FIG. 1.

Analog electrical signals sig_in are thus present at the output of the comparator 7 as represented in FIG. 2*a*. In this case, the signals sig_in arise relative to their form as a function of the sweep rate and the characteristics of the comparator 7.

In FIG. 2*a*, several signals sig_in are carried within one sweep over the transit time or the delay, whereby the specified values for the transit time/delay are only examples and have no further significance. The signals sig_in repeat over time in accordance with the sequential sweeps to the extent that the objects associated with the signals are quasi-stationary relative to the radial distance. This follows in FIG. 2*a* from the sweeps 0, 1, 2, and 3. Changes in the position of the signals sig_in in sweeps following one after the other correspond to a change of the distance of the object 4.

Within one of said sweeps, the time axis simultaneously represents the distance of the objects 4 from the distance sensor 3. If the signal sig_in at a definite point in time has a non-zero amplitude, then this means that an object is present at the corresponding distance. If the signal sig_in at a definite point in time has no amplitude significantly exceeding the noise, then this means that no object is present at the corresponding distance.

The following further explanation of the circuit 1 assumes this signal sig_in is an input-side pulse group. In this case, it is insignificant whether the signal sig_in was generated in the manner described. It is significant that the signal sig_in has the meaning described. It is expressly noted that the signal sig_in can be generated or arise in other ways.

As already explained, the sweep voltage generated by the sweep generator 6 corresponds to the distance of the object 4 from the distance sensor 3. Also, this distance corresponds to the time axis of the signal sig_in within one sweep. Furthermore, as mentioned above, it is known that due to the spatial attenuation, the pulse signal transmitted by the transmitter is damped nearly quadratically until it is received by the receiver of the distance sensor 3 once again.

This damping is compensated for by a circuit block 8 of the circuit 1. The circuit block 8 circuit represents a control with which the signal sig_in is linked to a function of the sweep variable. The functional dependence is quadratic to the distance in this case. The linking is a multiplication. Functions other than those described are also conceivable for the dependence as well as for the linking.

The circuit block 8 has two multipliers 9 and 10 connected in series, to each of which the sweep voltage generated by the sweep generator 6 is fed. The signal sig_in is fed to the first multiplier 9 and the output signal of the first multiplier 9 is fed to the second multiplier 10.

The signal sig_in is evaluated by the circuit block 8 quadratically with the sweep voltage. This means that in the case of an amplitude of the signal sig_in, which is associated with an object that is a long distance, e.g., from the distance sensor 3, the sweep voltage is high and thereby the high attenuation resulting from the long distance is equalized by the quadratic linkage to the high sweep voltage. Correspondingly, in the case of an amplitude of the signal sig_in which is associated with an object which is a short distance from the distance sensor 3, the sweep voltage will be small so that the low attenuation resulting from the short distance is also correctly equalized by the quadratic relation to the small sweep voltage.

Note that in the context above it is not a matter of the magnitude of the amplitude of the signal sig_in but rather of the point in time of the occurrence of this amplitude. As explained above, a definite distance of the object 4 from the distance sensor 3 corresponds to this point in time and thus also to a definite value of the sweep voltage. The amplitude of the signal sig_in is thus multiplied by the square of the sweep voltage. Only this has a change of the amplitude of the signal sig_in as a consequence. The change is in this case directed opposite to the preceding attenuation of the pulse signal on its way from the transmitter to the object 4 and back to the receiver of the distance sensor 3.

Overall compensation of the distance-dependent attenuation of the pulse signal by a function of the sweep voltage thus occurs in the circuit block 8.

Figure 3:
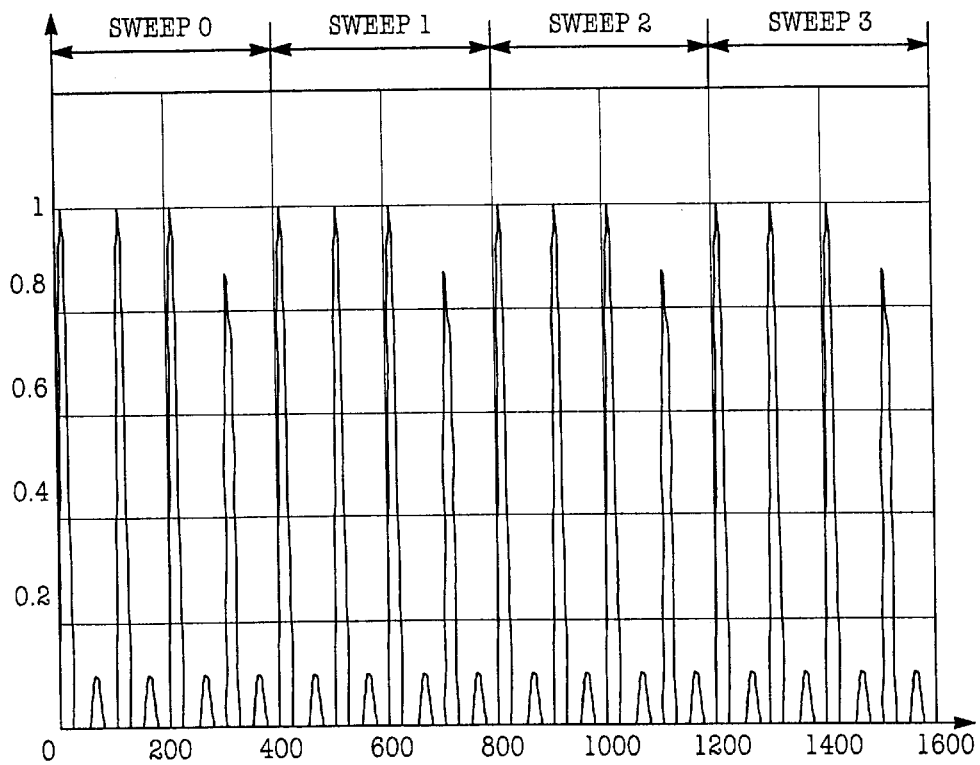
FIG. 3 shows an additional schematic signal waveform over time of a possible signal of the circuit of FIG. 1.

This compensation has as its consequence that the signal sig_in as represented in FIG. 2*a*, changes over into a compensated signal at the output of the second multiplier 10, as represented in FIG. 3. Concerning this the following must be explained.

The pulse signal transmitted by the transmitter of the distance sensor 3 is not only reduced due to the spatial attenuation but also is a function of the size, the reflectivity, and other parameters of the object 4 affecting the reflection. For example, the signal received by the receiver of the distance sensor 3 is weaker in the case of a small object with poor reflectivity while the signal received is stronger in the case of a large object with good reflectivity.

In the example case described, it is assumed that a total of eight objects are located in front of the motor vehicle.

Furthest removed is a large object with good reflectivity, then follows somewhat nearer a small object with poor reflectivity, then follows once again somewhat nearer a large object, and so on. Large and small objects thus alternate with the closest object being a small object with poor reflectivity.

This arrangement of the objects produces the waveform of the signal sig_in according to FIG. 2a. Since the sweep voltage of a large initial value runs to a small final value, that amplitude occurs first in FIG. 2a which belongs to the object furthest removed. Then the distance becomes smaller and smaller and the eighth amplitude belongs to the closest object.

The magnitudes of the amplitudes are a function of the size of the object associated with each. The farthest object is large so that the amplitude would also have to be large. This first amplitude in FIG. 2a is damped due to the spatial attenuation. The next closest object is small so that the associated amplitude is also small. This amplitude is damped still more due to the spatial attenuation. The last object is, as mentioned above, a small object. Since this object is only a short distance away, the spatial attenuation is small, so that the associated amplitude is also probably small but not so small as, for example, in the case of the second amplitude.

Overall, the magnitudes of the eight amplitudes of the signal sig_in in FIG. 2a follow from this as values increasing with decreasing distance which alternate due to the also alternating arrangement of large and small objects.

In FIG. 3, the magnitudes of every other amplitude of the output signal sig represented for the multiplier 10 are approximately equally large. This follows from the fact that due to the circuit block 8, the spatial attenuation and thus the distance of the object 4 from the distance sensor 3 no longer plays a role. However, the size of the respective objects continues to have an influence on the present signal sig.

From FIG. 3 it follows that alternatingly large and small objects are arranged one after the other at decreasing distances. The different magnitudes of the amplitudes following one after the other is therefore a consequence of the size of the objects. The 7th amplitude is somewhat reduced since it is limited by an override which is not compensated for by the previously described control.

At this point, note that the signal sig represented in FIG. 3 need not be present without fail in a realized circuit. For example; in the circuit of FIG. 5 described below, this signal sig is not present since in this circuit the manipulated variable links control and regulation elements together.

In the circuit 1 of FIG. 1, the circuit block 8 is arranged upstage to an additional circuit block 11. The circuit block 11 is a regulation element. With the aid of circuit block 11, the output signal sig of the multiplier 10 represented in FIG. 3 is regulated to a reference signal.

The circuit block 11 has a multiplier 12 which responds to the output signal sig of the multiplier 10 represented in FIG. 3. The multiplier 12 is followed by a comparator 13 which also receives an input signal from a reference signal generator 14, which, for example, supplies a reference signal with the constant "0.5". A characteristic curve 15 and damping element 16 are connected downstage to the comparator 13. The output signal of the damping element 16 is output to an adder 17, to the output of which a delay element 18 is connected. The output signal of the delay element 18 is fed back to the adder 17 as well as fed to another adder 19. The adder 19 also responds to an initial value which, for example, can be the constant "1.0" and which is generated by an initial value generator 20. The output signal of the adder 19 is input to the multiplier 12.

Figure 4:
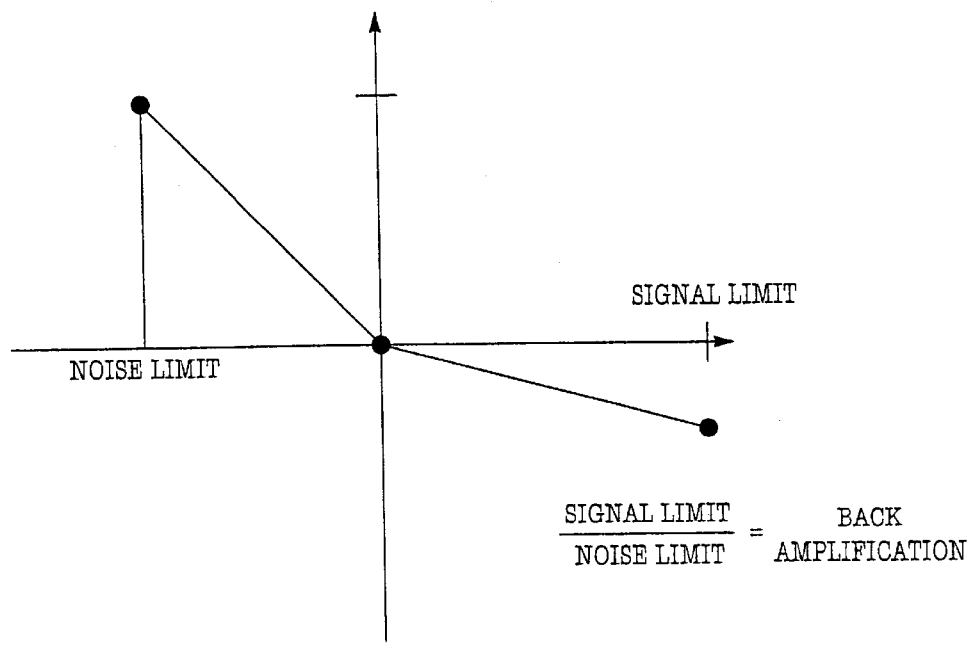
FIG. 4 shows a schematic representation of a characteristic curve of the circuit of FIG. 1.

An example of the characteristic curve 15 is represented in FIG. 4. The input signal of the characteristic curve 15 is plotted on the x-axis and the output signal on the y-axis. The input signal of the characteristic curve 15 represents approximately the deviation of output signal of the multiplier 10 represented in FIG. 3 from the reference signal "0.5".

Each input signal whose deviation from the reference signal is not equal to zero requires the intervention of regulation. The characteristic curve 15 must thus pass through the origin. In this case, the deviation for regulation is zero, and thus no correction is required.

The minimum input signal present on the negative side of the characteristic curve 15 is fixed by a noise limit, below which the input signal is no longer taken into account. In this case, the signal of FIG. 3 is so small that no object is assumed at the corresponding distance.

The maximum input signal present on the positive side of the characteristic curve 15 is fixed by a signal limit by which the signal sig is limited for reasons of circuit technology, for example, because the input range of the multiplier is exceeded.

In FIG. 4, the characteristic curve 15 is represented linearly. It is, however, also possible that the characteristic curve 15 is composed of curve segments. Also, it is possible that the characteristic curve has a curve deviating fundamentally from the curve represented.

The damping element 16 can, for example, be a so-called VZ1 element, which is provided for the purpose of smoothing strong overshoots of the output signal of the characteristic curve 15 or to dampen the regulation structure so that the form of the signal of the magnitude to be regulated is not changed too seriously.

The delay element 18 outputs its input signal after a predetermined delay. The delay is influenced according to FIG. 1 by a microprocessor 23 which also drives the sweep generator 6. The delay corresponds in this case exactly to the sweep period of a single sweep; therefore, the time for one sweep to pass from its initial value to its final value is required.

Any deviation of a pulse of the output signal sig_out of the multiplier 12 represented in FIG. 3 from the reference signal is recognized by the comparator 13. The deviation is evaluated by the characteristic curve 15, and a positive or negative correction is generated by the characteristic curve 15. This correction is smoothed by the damping element 16. Then the correction is delayed by the delay element 18 so that the correction only becomes active at the quasi-stationary pulse in the next sweep. The correction to the signal of FIG. 3 is actualized by the multiplier 12.

By feeding back the output signal of the delay element 18 to the adder 17, a correction processed in one sweep can also still be taken into account in the next sweep. Thus, the following manipulated variable to be determined is only the increment of the previous correction.

After connection, the delay element 18 has the output value "0". So that the circuit block 11 can respond to any regulation, the initial value generator 20 is provided, with which, after connection, the value "1" is preset to initiate regulation.

Figure 2B:
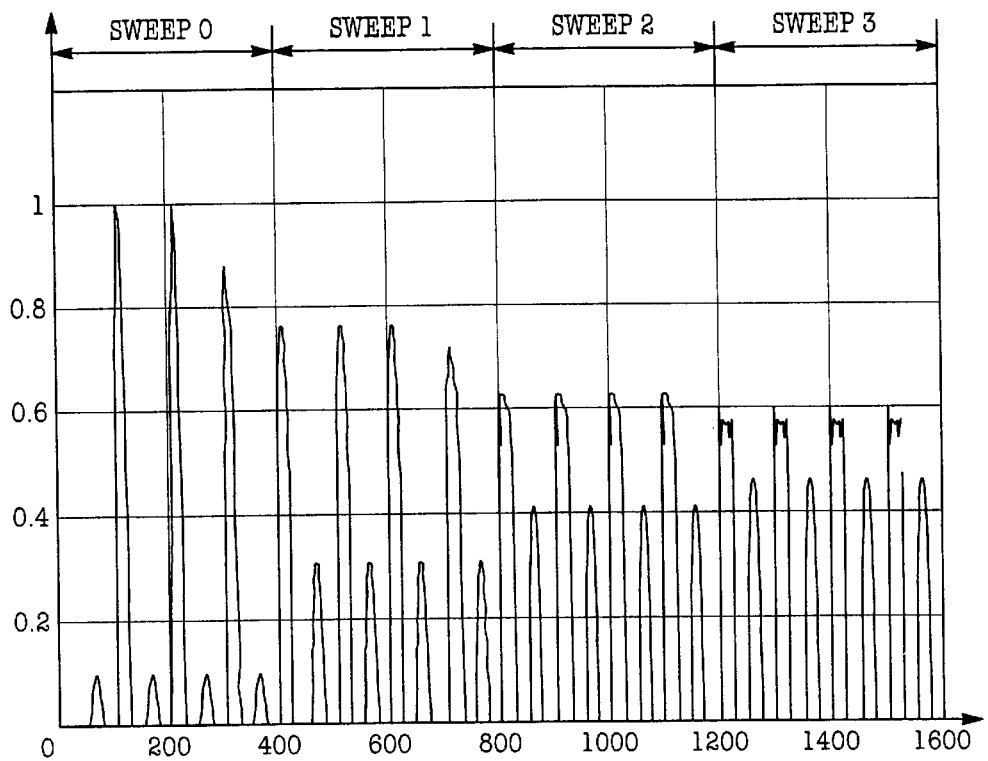

After several sweeps, a signal sig_out appears at the output of the multiplier 12, as shown in FIG. 2b. Of course, after a certain transient recovery time, the maximum values of the amplitudes approach the value "0.5", and therefore, the desired reference value.

The influence of size, reflectivity, etc. of the individual objects are thus compensated for by the circuit block 11. For all objects 4, approximately equal amplitudes result which thus can be further processed reliably and precisely.

Overall, a standard of the analog electrical signal sig_in was done with the aid of the circuit blocks 8 and 11. Moreover, the signal sig_out appearing at the output of the multiplier 12 can, for example, be fed to an analog/digital converter for further digital signal processing. The input range of this analog/digital converter can then be exploited optimally since the signal sig_out, as mentioned above, is referenced to a reference value. From this process a slight quantization noise results in the conversion of small pulses which were amplified by the regulation or control to the reference magnitude. Excessively large pulses are damped to the reference magnitude in order to avoid overdriving.

Figure 5:
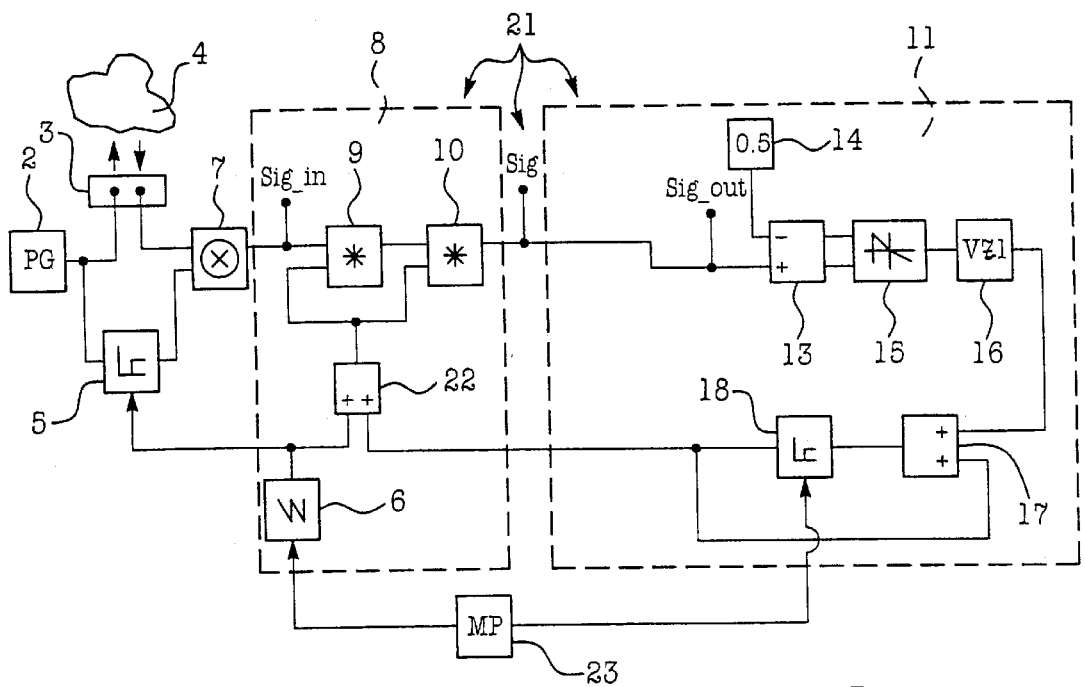
FIG. 5 shows an additional schematic block diagram of a second embodiment example of a circuit according to the invention for the processing of an analog electrical signal.

In FIG. 5, a circuit 21 is represented which corresponds essentially to the circuit 1 of FIG. 1. For this reason, the corresponding components have been assigned the same reference numerals.

The difference between circuit 21 of FIG. 5 and circuit 1 of FIG. 1 is that in circuit 1 the control and the regulation are completely independent, while in circuit 21 the control and the regulation have a common control action, and thus overlap. In the case of circuit 21, the compensation for the spatial attenuation is accomplished by the control at the same time as the control action of the regulation so that the resulting control action is composed of both components at the same time.

The multiplier 12 of FIG. 1 is not present in the circuit 21 of FIG. 5. The output signal of the delay elements 18 is thus linked via an adder 22 to the output signal of the sweep generator 6 and then fed to the two multipliers 9 and 10.

The adder 19 and the initial value generator 20 of the circuit 1 of FIG. 1 are also omitted. The initial value is predetermined in the circuit 21 of FIG. 5 by the sweep generator 6.

The output signal sig_out of the multiplier 10 of the circuit 21 of FIG. 5 essentially corresponds to the signal sig_out of FIG. 2b and thus to the signal sig_out of the circuit 1 of FIG. 1.

What is claimed is:

1. A method for processing an analog electrical signal which is reflected from an object and is received by a receiver where the amplitude of the signal received is a function of the distance of the object from the receiver, the method comprising the steps of:
   providing a reference signal having a predetermined magnitude;
   adapting the analog received signal to the reference signal;
   providing an analog output signal having a magnitude corresponding to the analog received signal adapted to the reference signal; and
   converting the analog output signal to a digital signal.

2. The method according to claim 1, wherein the step of adapting the received signal to the reference signal further comprises the step of comparing the received signal to the reference signal.

3. The method according to claim 2, wherein the step of adapting the received signal to the reference signal further comprises the step of influencing the signal by a correction quantity which is a function of the result of the comparison.

4. The method according to claim 3, wherein the step of adapting the received signal to the reference signal further comprises the step of linking the result of the comparison to a characteristic curve.

5. The method according to claim 4, wherein the step of adapting the received signal to the reference signal further comprises the step of outputting the result of the comparison to a damping element.

6. The method according to claim 5, wherein the step of adapting the received signal to the reference signal further comprises the step of delaying the result of the comparison with a delay element.

7. The method according to claim 6, wherein the step of adapting the received signal to the reference signal further comprises the step of linking the signal to a function with which the dependence on distance can be compensated.

8. The method according to claim 7, wherein the step of adapting the received signal to the reference signal further comprises the step of linearly increasing or decreasing the function from an initial value to a final value.

9. The method according to claim 8, wherein the initial value and the final value correspond to the minimum and maximum distance to be detected.

10. The method according to claim 9, wherein the step of adapting the received signal to the reference signal further comprises the step of continually repeating the function with a sweep period.

11. The method according to claim 10, wherein the step of adapting the received signal to the reference signal further comprises the step of linking the signal to a quadratic function.

12. The method according to claim 11, wherein the delay corresponds to the sweep period.

13. An electronic circuit for processing an analog signal with a receiver for receiving the signal reflected by an object where the amplitude of the signal received is a function of the distance of the object from the receiver, comprising:
   a reference signal having a predetermined magnitude;
   a regulation circuit for adapting the analog received signal to a reference signal and providing an analog output signal having a magnitude corresponding to the received signal adapted to the reference signal; and
   an analog/digital converter for converting the analog output signal to a digital signal.

14. The circuit according to claim 13, further comprising:
   means for linking the received signal to a function with which the functional dependence on the distance can be compensated.

* * * * *